United States Patent [19]
Rogers

[11] 3,800,611
[45] Apr. 2, 1974

[54] ENDLESS POWER TRANSMISSION BELT
[75] Inventor: Jerry W. Rogers, Springfield, Mo.
[73] Assignee: Dayco Corporation, Dayton, Ohio
[22] Filed: Jan. 10, 1973
[21] Appl. No.: 322,343

[52] U.S. Cl. .............................................. 74/234
[51] Int. Cl. ........................... F16g 1/00, F16g 5/00
[58] Field of Search ................... 74/234, 237, 231 R

[56] References Cited
UNITED STATES PATENTS
3,667,308  6/1972  Schwab ........................... 74/237 X Primary Examiner—Leonard H. Gerin

[57] ABSTRACT

An endless power transmission belt having an extended service life is provided and such belt has a cover which has a layer of a polyepichlorohydrin elastomer which defines a substantially air-impervious shield for the belt and such layer improves aging resistance and assures an extended service life for the belt.

9 Claims, 3 Drawing Figures

PATENTED APR 2 1974   3,800,611
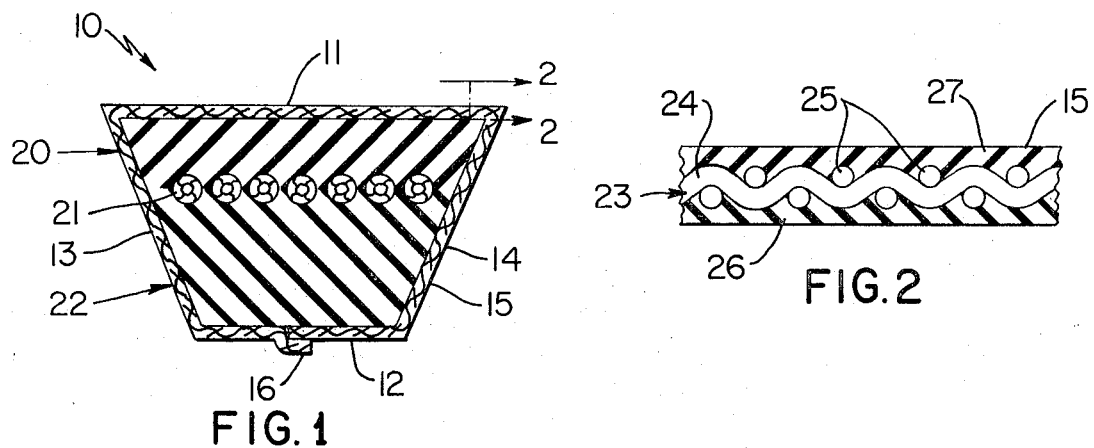
FIG. 1
FIG. 2
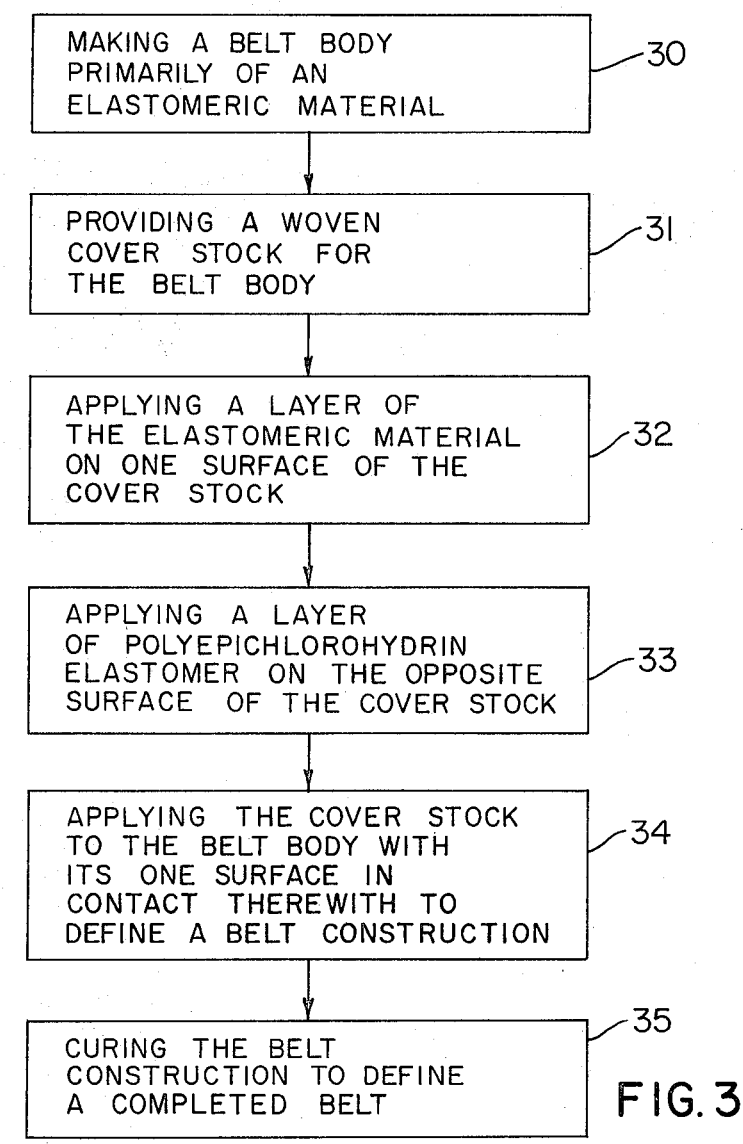
FIG. 3

ENDLESS POWER TRANSMISSION BELT

BACKGROUND OF THE INVENTION

There are numerous endless power transmission belts in current use each of which is made primarily of an elastomeric material such as a natural or synthetic rubber, plastic material or the like. Neoprene rubber is widely used to make high quality belts and with aging (especially at temperatures of approximately 250° F and above, which are common for many applications of such present belts) neoprene rubber hardens and cracks to thereby destroy the belt. However, it has been found that the aging resistance of elastomeric materials, such as neoprene rubber, may be substantially improved if the belt body is effectively shielded against ambient air to thereby prevent oxidation and thus increase the service life of the associated belt.

SUMMARY

This invention provides an improved endless power transmission belt having a belt body made primarily of an elastomeric material and having a cover which has a layer of elastomeric material on one surface thereof and a layer of polyepichlorohydrin elastomer on its opposite surface with the cover covering the belt body with its one surface in contact therewith and the polyepichlorohydrin layer defining a substantially air-impervious shield for the belt which improves its aging resistance and assures an extended service life.

Other details, uses, and advantages of this invention will be readily apparent from the embodiments thereof presented in the following specification, claims and drawing.

BRIEF DESCRIPTION OF THE DRAWING

The accompanying drawing shows a present preferred embodiment of this invention, in which FIG. 1 is a cross-sectional view illustrating one exemplary embodiment of an endless power transmission belt of this invention;

FIG. 2 is an enlarged fragmentary cross-sectional view taken essentially on line 2—2 of FIG. 1; and FIG. 3 is a block diagram presentation of the method employed to make the belt of FIG. 1.

DETAILED DESCRIPTION

Reference is now made to FIG. 1 of the drawing which shows a cross-sectional view of one exemplary embodiment of an endless power transmission belt of this invention which is designated generally by the reference numeral 10. The belt 10 has a trapezoidal outline as viewed in cross section and defined by top and bottom parallel walls or surfaces 11 and 12 respectively and opposed symmetrically arranged non-parallel sides 13 and 14 and the belt 10 is often popularly referred to as a V-belt.

The belt 10 has a cover 15 which covers its entire peripheral outline and a slight overlap 16 is provided in the cover against the bottom wall 12. The cover 15 covers a belt body which is made primarily of an elastomeric material and such body includes a tension section 20, a load-carrying section 21 defined in this example by load-carrying means in the form of a spirally wound load-carrying cord 21, and a compression section 22. Any suitable elastomeric material may be employed to define the main portion of the belt body which includes the tension and compression sections and although the belt 10 employs neoprene rubber to define the main portion of its belt body such elastomeric material may be in the form of any suitable natural or synthetic rubber, or a suitable plastic material.

The cover 15 is preferably made of a woven fabric 23, see FIG. 2, and such woven fabric may be a cotton fabric, a synthetic fabric which has been suitably treated, or a fabric made from any other suitable material. The woven fabric 23 has the usual warps 24 and wefts 25 and such fabric is preferably bias cut whereby both the warps 24 and wefts 25 extend at an angle to a central plane arranged perpendicular to the parallel top and bottom surfaces 11 and 12 of the belt 10. However, it will be appreciated that the fabric need not necessarily be a bias cut fabric and in some applications it may be desirable to have either the warps 24 or wefts 25 extend parallel to the longitudinal axis of the belt, for example.

The cover 15 has a layer 26 defining one surface thereof and the layer 26 is made preferably of the same elastomeric material comprising the major portion of the main body of the belt 10; and, the cover 15 has an opposite surface made of a layer of a polyepichlorohydrin elastomer 27. As will be apparent from FIG. 1, the cover 15 covers the belt body with its surface 26 in intimate tenacious contact therewith and with the polyepichlorohydrin layer 27 defining the outside surface of the belt 10 and the layer 27 defines a substantially air-impervious shield or barrier for the belt 10.

As mentioned earlier, it has been found that the polyepichlorohydrin layer 27 of the belt 10 prevents oxidation of the elastomeric material defining the main portion of the belt body and thereby improves its aging resistance and thus extends the service life of the belt 10. For example, in the case of a belt 10 having a main body portion made primarily of neoprene rubber, having a cover provided with a layer 27, and operating at ambient temperatures generally of the order 250° F, and above, it has been found that the service life of such belt is extended many times over the service life of a belt which is not so protected by a cover having an outside polyepichlorohydrin layer.

Having described the belt 10 in a detailed manner, the description will now proceed making particular reference to FIG. 3 and with a presentation of the method employed to make such belt. In particular, as shown by the block indicated at 30, a belt body is made primarily of any suitable elastomeric material and such belt body when completed would have the appearance of the belt body illustrated in FIG. 1 within the outer cover 15. Any technique known in the art may be used to make the belt body.

As shown by the block at 31, a cover stock which is preferably in the form of a woven cover stock is provided. The cover stock or woven cover 23 is processed by applying the layer 26 of elastomeric material on one surface thereof as indicated by the block at 32, and the layer 26 is illustrated in FIG. 2. The layer 26 is preferably made of the same elastomeric material used to define the belt body whereby a tenacious bond between the belt body and cover 15 is assured. The polyepichlorohydrin elastomer layer 27 is then applied on the opposite surface of the cover stock 23 as indicated in the block 33 and such layer is designated by the reference numeral 27 in FIG. 2.

The cover stock with the layer of elastomeric material 26 defining one surface and the layer of polyepichlorohydrin elastomer 27 defining its opposite surface is then suitably applied to the belt body as by a wrapping action, for example, with the surface layer 26 in contact with such belt body to define a belt construction and as indicated by the block 34. Any suitable apparatus or technique may be employed to apply the cover 15, defined by cover stock 23 and layers 26 and 27, to the belt body whereby the cover may have an overlap 16 as indicated in FIG. 1 or such cover may be applied by a spiral winding process and as is well known in the art.

The belt construction defined after covering the belt body with the cover 15 is then suitably cured using techniques and apparatus known in the art to define a completed belt illustrated in cross section in FIG. 1 and designated by the reference numeral 10 and such curing is designated by the block 35.

Any suitable apparatus and technique may be employed to apply the layer of elastomeric material 26 on one surface of the cover stock 23 and the layer of polyepichlorohydrin elastomer 27 on the opposite surface of such cover stock; however, such application is preferably achieved by what is commonly referred to as frictioning or calendering wherein a calendering press is employed and the material being applied on the cover stock is pressed by either a plate or cooperating rollers against the associated surface of the cover stock.

Thus, it is seen that an improved endless power transmission belt and a method of making the same is provided wherein such belt has a polyepichlorohydrin layer defining a substantially air-impervious shield for the belt which improves aging resistance and assures that the belt will have an extended service life.

While present exemplary embodiment of this invention, and methods of practicing the same, have been illustrated and described, it will be recognized that this invention may be otherwise variously embodied and practiced within the scope of the following claims.

What is claimed is:

1. An endless power transmission belt having an extended service life and comprising, a belt body made primarily of an elastomeric material, and a cover having a layer of said elastomeric material on one surface thereof and a layer of polyepichlorohydrin elastomer on its opposite surface, said cover covering said belt body with its one surface in contact therewith and said polyepichlorohydrin layer defining a substantially air-impervious shield for said belt which improves aging resistance and assures said extended service life.

2. A belt as set forth in claim 1 having a substantially trapezoidal cross-sectional configuration.

3. A belt as set forth in claim 1 in which said body includes a tension section, a load-carrying section, and a compression section.

4. A belt as set forth in claim 3 in which said cover is made of woven fabric.

5. A belt as set forth in claim 4 in which said body has a trapezoidal cross-sectional configuration including opposed substantially parallel surfaces and said woven fabric has warps and wefts arranged at an angle to a plane perpendicular to the substantially parallel surfaces.

6. A belt as set forth in claim 3 in which said cover is made of a cotton fabric.

7. A belt as set forth in claim 3 in which said cover is made of a synthetic fabric.

8. A belt as set forth in claim 1 in which said elastomeric material is a rubber compound.

9. A belt as set forth in claim 1 in which said elastomeric material is neoprene rubber.

* * * * *